(12) United States Patent
Vytiniotis et al.

(10) Patent No.: US 10,496,534 B2
(45) Date of Patent: Dec. 3, 2019

(54) MANUAL MEMORY MANAGEMENT USING LAZY PATCHING

(71) Applicant: Microsoft Technology Licensing, LLC, Redmond, WA (US)

(72) Inventors: Dimitrios Vytiniotis, Cambridge (GB); Manuel Silverio da Silva Costa, Cambridge (GB); Kapil Vaswani, Cambridge (GB); Matthew John Parkinson, Cambridge (GB); Piyus Kumar Kedia, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/624,687

(22) Filed: Jun. 15, 2017

(65) Prior Publication Data

US 2018/0276120 A1    Sep. 27, 2018

(30) Foreign Application Priority Data

Mar. 27, 2017    (GB) .................................. 1704844.8

(51) Int. Cl.
*G06F 12/02*    (2006.01)
*G06F 12/14*    (2006.01)
*G06F 12/109*    (2016.01)

(52) U.S. Cl.
CPC ........ *G06F 12/0261* (2013.01); *G06F 12/023* (2013.01); *G06F 12/145* (2013.01); *G06F 12/0253* (2013.01); *G06F 12/109* (2013.01); *G06F 2212/1016* (2013.01); *G06F 2212/1044* (2013.01); *G06F 2212/1052* (2013.01); *G06F 2212/657* (2013.01)

(58) Field of Classification Search
CPC ......... G06F 12/0253; G06F 2212/1044; G06F 12/023; G06F 12/0261; G06F 3/0608; G06F 2212/657; G06F 2212/7205; G06F 2212/1016; G06F 2212/1052; G06F 12/145; G06F 12/109
USPC .................................................. 711/166, 170
See application file for complete search history.

(56) References Cited

U.S. PATENT DOCUMENTS

| | | | |
|---|---|---|---|
| 5,873,105 A | 2/1999 | Tremblay et al. | |
| 5,953,736 A | 9/1999 | O'Connor et al. | |
| 6,098,089 A | 8/2000 | O'Connor et al. | |
| 6,243,860 B1 * | 6/2001 | Holland ............. | G06F 8/41 717/111 |
| 7,831,961 B1 | 11/2010 | Bush et al. | |
| 7,912,877 B2 | 3/2011 | Shankar et al. | |
| 8,255,887 B2 | 8/2012 | Heil | |
| 8,312,219 B2 | 11/2012 | Cher et al. | |

(Continued)

OTHER PUBLICATIONS

Gay, et al., "Safe manual memory management", In Proceedings of the 6th international symposium on Memory management, Oct. 21, 2007, pp. 2-14.

(Continued)

*Primary Examiner* — Hashem Farrokh

(57) ABSTRACT

A method of manual memory management is described. In response to detecting an access violation triggered by the use of an invalid reference to an object in a manual heap, a source of the access in a register or stack is identified. An updated reference for the object using stored mapping data is determined and used to replace the invalid reference in the source.

20 Claims, 7 Drawing Sheets

(56) References Cited

U.S. PATENT DOCUMENTS

| | | | |
|---|---|---|---|
| 2006/0190697 A1 | 8/2006 | Grant | |
| 2012/0278665 A1* | 11/2012 | Serebryany | G06F 11/073 714/53 |
| 2015/0227414 A1* | 8/2015 | Varma | G06F 11/073 714/47.1 |
| 2017/0344468 A1* | 11/2017 | Kirshenbaum | G06F 12/023 |

OTHER PUBLICATIONS

"Oracle: The Java HotSpot Performance Engine Architecture", http://www.oracle.com/technetwork/java/whitepaper-135217.html, Retrieved on: Jan. 9, 2017, 7 pages.

"Fundamentals of garbage collection", https://msdn.microsoft.com/en-us/library/ee787088(v=vs.110).aspx, Retrieved on: Jan. 10, 2017, 14 pages.

".NET Native and Compilation", https://msdn.microsoft.com/en-usilibrary/dn807190(v=vs.110).aspx, Retrieved on: Jan. 10, 2017, 5 pages.

"Electric fence", http://elinux.org/Electric_Fence, Retrieved on: Jan. 10, 2017, 3 pages.

"How to use Pageheap utility to detect memory errors", https://support.microsoft.com/en-us/kb/264471, Published on: Jun. 25, 2002, 6 pages.

"Rust programming language", https://www.rust-lang.org/en-US/, Published on: Dec. 22, 2016, 3 pages.

Akritidis, Periklis, "Cling: A memory allocator to mitigate dangling pointers", In Proceedings of the 19th USENIX conference on Security, Aug. 11, 2010, 16 pages.

Bacon, et al., "The metronome: A simpler approach to garbage collection in real-time systems", In Proceedings OTM Confederated International Workshop on Java Technologies for Real-Time and Embedded Systems, Nov. 5, 2003, 20 pages.

Baker, Henry G., "Use-once variables and linear objects—storage management, reflection, and multi-threading", In ACM SIGPLAN Notice, vol. 30, Issue 1, Jan. 1995, 8 pages.

Berger, et al., "Diehard: probabilistic memory safety for unsafe languages", In Proceedings of the PLDI Conference ACM SIGPLAN Notices, vol. 41, Issue 6, Jun. 2006, pp. 158-168.

"Ownership types for safe region-based memory management in realtime Java", In Proceedings of the ACM SIGPLAN conference on Programming language design and implementation, Jun. 9, 2003, pp. 324-337.

John Boyland, "Alias burying: Unique variables without destructive reads", In Journal of Software—Practice & Experience—Special issue on aliasing in object-oriented vol. 31, Issue 6, May 1, 2001, 21 pages.

Clarke, et al., "External uniqueness is unique enough", In European Conference on Object-Oriented Programming, Jul. 21, 2003, 25 pages.

Clarke, et al, "Ownership types for flexible alias protection", In Proceedings of the 13th ACM SIGPLAN conference on Object-oriented programming, systems, languages, and applications, Oct. 18, 1998, pp. 48-64.

Click, et al., "The Pauseless GC algorithm", In Proceedings of the 1st ACM/USENIX international conference on Virtual execution environments, Jun. 11, 2005, pp. 46-56.

Degenbaev, et al., "Idle time garbage collection scheduling", In Proceedings of the 37th ACM SIGPLAN Conference on Programming Language Design and Implementation, Jun. 2, 2016, pp. 570-583.

Dhurjati, et al., "Efficiently detecting all dangling pointer uses in production servers", In Proceedings of the International Conference on Dependable Systems and Networks, Jun. 25, 2006 , 10 pages.

Dhurjati, et al., "Memory safety without runtime checks or garbage collection", In Proceedings of the ACM SIGPLAN conference on Language, compiler, and tool for embedded systems, Jun. 11, 2003, pp. 69-80.

Gidra, et al., "NumaGiC: a Garbage Collector for Big Data on Big NUMA Machines", In Proceedings of the Twentieth International Conference on Architectural Support for Programming Languages and Operating Systems, Mar. 14, 2015 , pp. 661-673.

Gog, et al., "Broom: Sweeping out garbage collection from big data systems", In Proceedings of 15th Workshop on Hot Topics in Operating Systems, May 18, 2015, 7 pages.

Grossman, et al., "Region-based memory management in Cyclone", In Proceedings of the ACM SIGPLAN conference on Programming language design and implementation, Jun. 17, 2002, 12 pages.

Hertz, et al., "Quantifying the performance of garbage collection vs. explicit memory management", In Proceedings of the 20th annual ACM SIGPLAN conference on Object-oriented programming, systems, languages, and applications, Oct. 16, 2005 , pp. 313-326.

Hicks, et al., "Experience with safe manual memory-management in Cyclone", In Proceedings of the 4th international symposium on Memory management, Oct. 24, 2004, 12 pages.

Hogg, John, "Islands: Aliasing protection in object-oriented languages", In Conference proceedings on Object-oriented programming systems, languages, and applications, Oct. 6, 1991 , pp. 271-285.

Hundt, Robert, "Loop recognition in C++/Java/Go/Scala", In Proceedings of Scala Days, 2011, 10 pages.

Kermany, et al., "The compressor: Concurrent, incremental, and parallel compaction", In Proceedings of the 27th ACM SIGPLAN Conference on Programming Language Design and Implementation, vol. 41, Issue 6, Jun. 11, 2006, pp. 354-363.

Lee, et al. "Preventing use-afterfree with dangling pointer nullification", In Proceedings of Network and Distributed System Security Symposium, Feb. 11, 2015, 15 pages.

Lvin, et al., "Archipelago: trading address space for reliability and security", In Proceedings of ACM SIGOPS Operating Systems Review. vol. 42, No. 2, Mar. 1, 2008, 10 pages.

Maas, et al., "Taurus: A Holistic Language Runtime System for Coordinating Distributed Managed-Language Applications", In Proceedings of the Twenty-First International Conference on Architectural Support for Programming Languages and Operating Systems, Apr. 2, 2016, 15 pages.

Minsky, Naftaly H., "Towards alias-free pointers", In Proceedings of the 10th European Conference on Object-Oriented Programming, Jul. 8, 1996 , pp. 189-209.

Murray, et al., "Naiad: A timely dataflow system", In Proceedings of the Twenty-Fourth ACM Symposium on Operating Systems Principles, Nov. 3, 2013 , pp. 439-455.

Naden, et al., "A type system for borrowing permissions", In Proceedings of the 39th annual ACM SIGPLAN-SIGACT symposium on Principles of programming languages, Jan. 25, 2012, pp. 557-570.

Nagarakatte, et al., "CETS: compiler enforced temporal safety for C", In Proceedings of the international symposium on Memory management, Jun. 5, 2010, pp. 31-40.

Nguyen, et al., "Yak: a high-performance big-data-friendly garbage collector", In Proceedings of the 12th USENIX conference on Operating Systems Design and Implementation, Nov. 2, 2016, 17 pages.

Novark, et al., "Dieharder: securing the heap", In Proceedings of the 17th ACM conference on Computer and communications security, Oct. 4, 2010, pp. 1-11.

Sedgewick, Robert, "Left-leaning red-black trees", In Dagstuhl Workshop on Data Structures, Apr. 2008, 10 pages.

Smith, et al., "Alias Types", In Proceedings of in European Symposium on Programming, Mar. 2000, 16 pages.

Swamy, et al., "Safe manual memory-management in Cyclone", In Journal of Science of Computer Programming, vol. 62, Isuue 2, Oct. 2006, pp. 122-144.

Tene, et al., "C4: the continuously concurrent compacting collector", In Proceedings of the international symposium on Memory management, Jun. 4, 2011, pp. 79-88.

Tofte, et al., "Region-Based Memory Management", In Journal of Information and Computation, vol. 132, Issue 2, Feb. 1997, pp. 109-176.

Wadler, Philip, "Linear types can change the world", In IFIP TC 2 Working Conference, Apr. 1990, pp. 1-21.

(56) References Cited

OTHER PUBLICATIONS

Walker, et al., "On regions and linear types", In Proceedings of the sixth ACM SIGPLAN international conference on Functional programming, Sep. 3, 2001, pp. 181-192.

Walker, et al., "Typed Memory Management in a Calculus of Capabilities", In Journal of ACM Transactions on Programming Languages and Systems, vol. 24, Issue 4, 2000, pp. 1-87.

Younan, Yves, "FreeSentry: Protecting Against Use-After-Free Vulnerabilities Due to Dangling Pointers", In Proceedings of 22nd Annual Network and Distributed System Security Symposium, Feb. 8, 2015, pp. 1-15.

Zorn, Benjamin, "The measured cost of conservative garbage collection", In Journal of Software—Practice & Experience, vol. 23, Issue 7, Jul. 1993, 4 pages.

Nguyen, et al., "Facade: A compiler and runtime for (almost) object-bounded big data applications", In Proceedings of the Twentieth International Conference on Architectural Support for Programming Languages and Operating Systems, Mar. 14, 2015, pp. 675-690.

\* cited by examiner

MANUAL MEMORY MANAGEMENT USING LAZY PATCHING

BACKGROUND

Garbage collection improves programmer productivity because it frees programmers from having to consider object lifetimes and freeing memory and it also prevents temporal memory safety errors, i.e. uses of memory after it has been freed, which may lead to safety breaches. In contrast, manual memory management often delivers better performance, e.g. because a programmer can promptly deallocate objects and exploit their knowledge of object lifetimes to free objects at specific program locations, but is often unsafe and can lead to system crashes or security vulnerabilities because freeing memory may create dangling pointers, i.e. pointers to memory that has been freed, and dereferences of dangling pointers lead to undefined behavior.

The embodiments described below are not limited to implementations which solve any or all of the disadvantages of known methods of memory management.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of manual memory management is described. In response to detecting an access violation triggered by the use of an invalid reference to an object in a manual heap, a source of the access in a register or stack is identified. An updated reference for the object using stored mapping data is determined and used to replace the invalid reference in the source.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
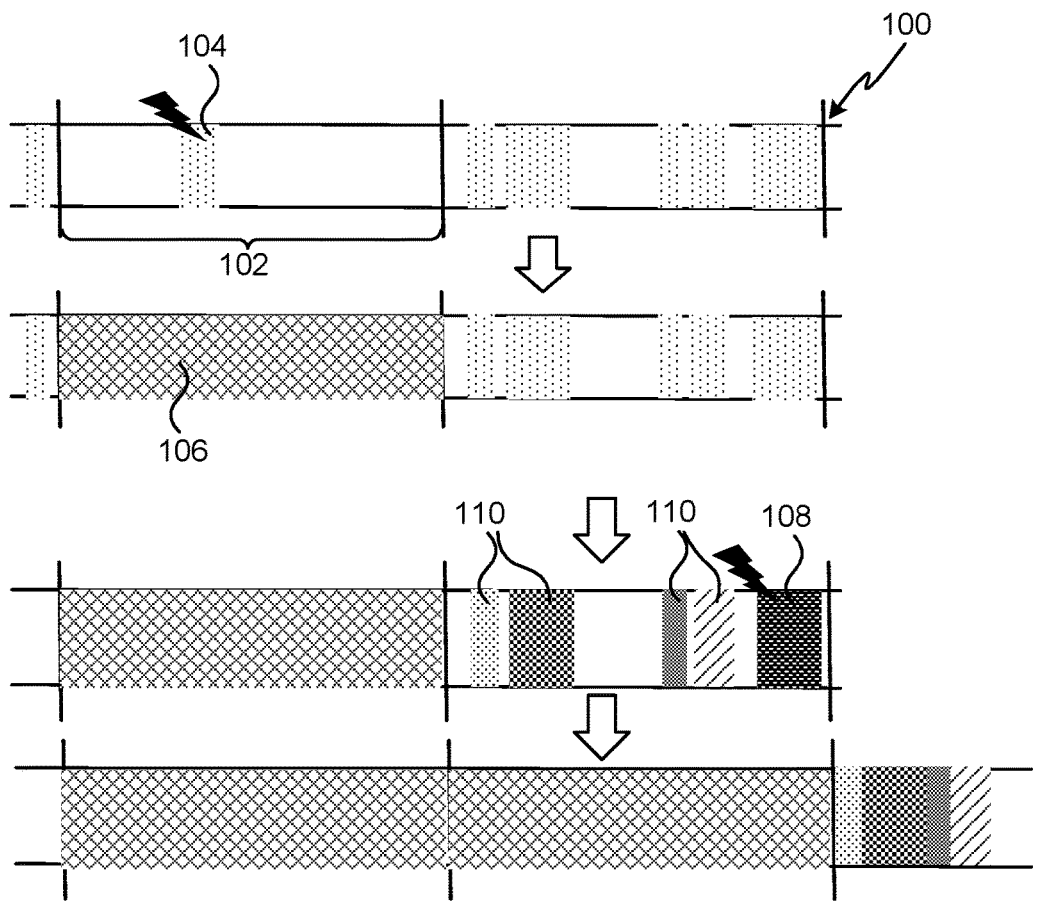
FIG. 1 shows a graphical representation of an example method of memory reclamation that involves eager relocation.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, manual memory management typically achieves better throughput and better memory usage than use of garbage collection (GC), but garbage collection ensures memory safety. In particular, where many cores and/or large data sets are used (e.g. for data analysis problems and machine learning), GC can become a bottleneck.

Described herein are methods of safe manual memory management which involve eager relocation of objects (in which objects are relocated when a fragmentation threshold is exceeded) and then lazy patching of references to those objects (in which patching occurs when an invalid reference is used). Whilst the two techniques, eager relocation and lazy patching, are described together, the methods may be used independently, e.g. the method of lazy patching may be used with a different relocation method and the method of eager relocation may be used with a different patching method (e.g. with eager patching of references in which patching occurs when an invalid reference is loaded).

As described in more detail below, each object is allocated a virtual address and the object is unmapped from the address space when the object has been deleted. Live objects are copied away from a virtual page of memory when fragmentation on the virtual page (as a consequence of objects being freed upon deletion), or across a plurality of virtual pages, exceeds a threshold and metadata is stored which maps the original objects (which may be referred to as source objects) to the copies of those objects (which may be referred to as target objects). References to these moved objects are not updated to point to the new locations when the references are loaded but instead the references are patched when they are used (i.e. when the pointers are dereferenced). This reduces the overhead at each load and is more efficient because loads happen much more frequently than dereferences. As well as patching a reference when used (i.e. remapping the invalid reference to a valid reference), the stack and registers may be scanned so that any identical references in the stack or registers can be patched at the same time. This reduces the occurrence of access violations (which are a consequence of dereferencing an invalid reference). To further reduce the number of access violations, the locations where the reference originated (e.g. objects in the heap) are may also be patched.

In various examples, the methods described herein involve modifying the compiler to generate metadata describing the location of heap references in registers and on the stack for every load and store instruction. This metadata may be used to identify the locations in the stack and registers that need to be patched in the event of an access violation (caused by use of an invalid reference), e.g. such that the metadata identifies locations in the stack and sets of registers that contain references and these locations and registers are scanned to identify the precise locations that need to be patched. Furthermore, the compiler may be modified to keep the parent reference alive (i.e. to maintain the reference to the parent in the register or stack) when a child is dereferenced (e.g. to enable patching of the parent object in the heap) and/or to modify code generation to make references to parent objects explicit (e.g. in the case of arrays of references).

Patching references for objects which have been moved at the time the references are used (i.e. dereferenced), instead of when the references are loaded, reduces the overhead at each load and is more efficient because loads happen much more frequently than dereferences. By additionally patching identical references in the stack and registers in response to an access violation, the number of access violations (which occur as a result of using a reference to an object that has been moved) is reduced and this may be further reduced by patching the locations where the reference originated (e.g. objects on the heap).

The use of a virtual address space as described above and the fact that the virtual address space is not reused until an application runs out of virtual address space means that any access to an object that has been moved or deleted will result in an access violation and not result in memory corruption.

A method of memory reclamation that involves eager relocation can be described with reference to FIGS. 1-2. As shown in FIG. 1, the virtual address space 100 may be divided into a plurality of blocks 102, which may be referred to as pages. When an object 104 is deallocated, the object is marked as freed (block 202) and if the entire page 102 is free ('Yes' in block 204), i.e. it only contains deallocated objects, then the physical memory (that corresponds to the page 102 of virtual memory) can be reclaimed by unmapping the virtual page 102 from the physical address space (block 206, as indicated by the hashed region 106 in FIG. 1). Any access to an unmapped virtual page will result in an access violation which is handled by an exception handler and the operation of this exception handler is described in more detail below.

If the object that is freed (e.g. object 108) is not the last live object in the virtual page ('No' in block 204), then the virtual page cannot be unmapped straight away. However, if the fragmentation of the page exceeds a threshold ('Yes' in block 208) then all the remaining live objects 210 on the virtual page are moved to a new virtual page and the virtual page can then be unmapped (block 210).

The memory reclamation (as described above with reference to FIGS. 1-2) may be implemented by an allocator. The degree of fragmentation is monitored by the allocator so that the allocator can determine when the fragmentation of a page exceeds the threshold and hence the moving of all live objects on the page is triggered (as described above). The degree of fragmentation and hence the threshold may be measured in any way. In various examples the degree of fragmentation may be determined based on the number of freed objects on a page or the size of the freed objects on a page (e.g. as a fraction of the total page size) and the threshold may be defined accordingly.

In various examples, the fragmentation may be considered (in block 208) at a larger granularity than a single page, e.g. across a group of pages or across the entire virtual address space. In various examples, the allocator may quantify the degree of heap fragmentation using the following measure:

$$f = \frac{\text{total\_size\_deleted} - (\text{num\_unmapped\_pages} \times \text{page\_size})}{\text{total\_size\_allocated} - \text{total\_size\_deleted}}$$

Here, total_size_allocated and total_size_deleted refer to the total bytes allocated and deleted respectively, num_unmapped pages refers to the number of unmapped pages. The numerator is the number of bytes yet to be reclaimed, and the denominator is the number of bytes allocated to live objects.

When the degree of fragmentation exceeds a pre-defined threshold value (and optionally enough time has elapsed since the last promotion, where this 'time' may be measured in terms of minutes and seconds or the amount of data allocated since the last promotion), the allocator creates a background thread that identifies a set of candidates pages for promotion, where the term 'promotion' refers to the operation of moving all live objects from a first page to another page and then unmapping the first page. The promotion policy used to select candidate pages for promotion may take into account the physical space that will be reclaimed (e.g. prefer pages with high fragmentation) and any costs of promoting objects (e.g. which may be any measure of the amount of work that needs to be performed as a consequence of relocating the objects, such as the number of references to the object). The promotion policy used respects object boundaries, i.e. all pages that share a live object are promoted together.

In an example implementation, promotion may be triggered when the amount of memory allocated since the last promotion phase is greater than 128 MB, and the degree of fragmentation, f is greater than 0.5. This policy is designed to keep the working set of the application to within a factor of 2 of the total size of live objects. When this condition holds, the allocator selects for promotion all pages where at least half the page contains deleted objects, sorts pages by degree of fragmentation and promotes pages in order until overall fragmentation f falls below ⅓.

Figure 2:
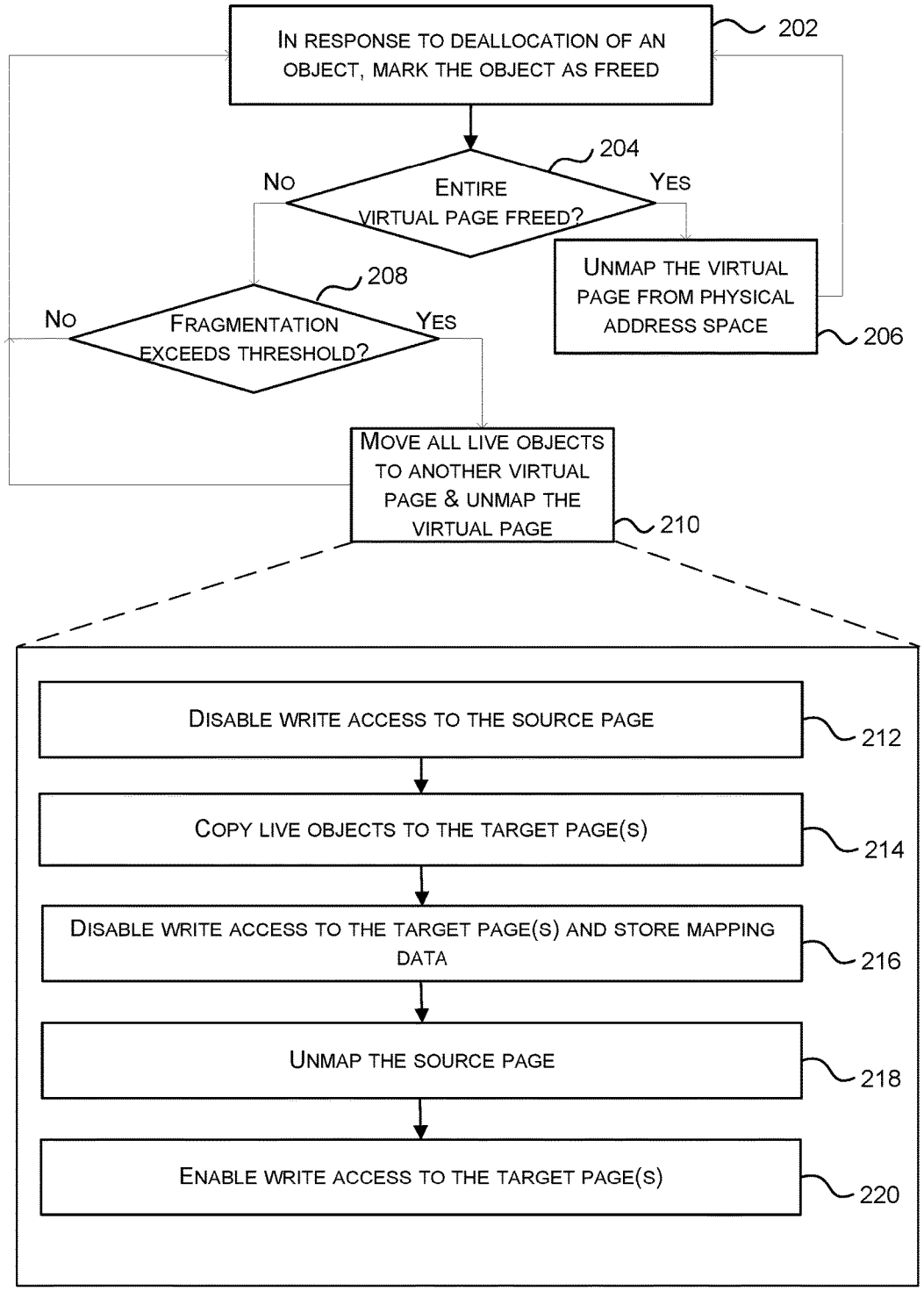
FIG. 2 is a flow diagram of the method shown in FIG. 1.

An example method of moving the live objects (i.e. those objects which have not been freed) is also shown in FIG. 2. In this example, the page that the live objects are originally on is referred to as the 'source' page and the page that the objects are moved to is referred to as the 'target' page. As described above, these pages are defined in virtual address space. As shown in FIG. 2, the method first disables write access to the source page (block 212). The objects on the source page are then scanned and live objects (e.g. objects with the free bit in the header unset) are copied to the target location, which may be a single target page or more than one target page (block 214). If the last live object on the source page spills over to the next page, the method also considers the next page (e.g. such that the method applies to more than one source page).

After copying the objects (in block 214), the allocator disables write accesses to the target page and stores (or updates) mapping data (block 216). The mapping data describes the relationship between the original location of objects (which may be referred to as source objects) and the new locations of those objects (which may be referred to as target objects). This mapping data, which may also be referred to as mapping metadata, may take the form of a data structure called the remap table and a plurality of offsets. For example, where the memory (e.g. the heap) managed by the allocator is organized as a set of segments (where each segment is a continuous part of the address space), the remap table maps each page to the offset within the segment where objects from the page have been copied. The allocator also stores the segment-relative offset of the source object in the target object header. The remap table combined with the offset in object headers allows the allocator to find the target object given an address on the source page. After storing (or updating) the mapping data (in block 216), the allocator unmaps the source page (block 218), thereby reclaiming unused physical memory, and then enables write access to the target page (block 220).

This protocol for promoting live objects (blocks 212-220) ensures that at any given point in time, there is at most one writable copy of each object. Also, unmapping the source page (in block 218) before enabling write access to the target page (in block 220) ensures that only the copy of the object on the target page can be read thereafter.

Figure 3:
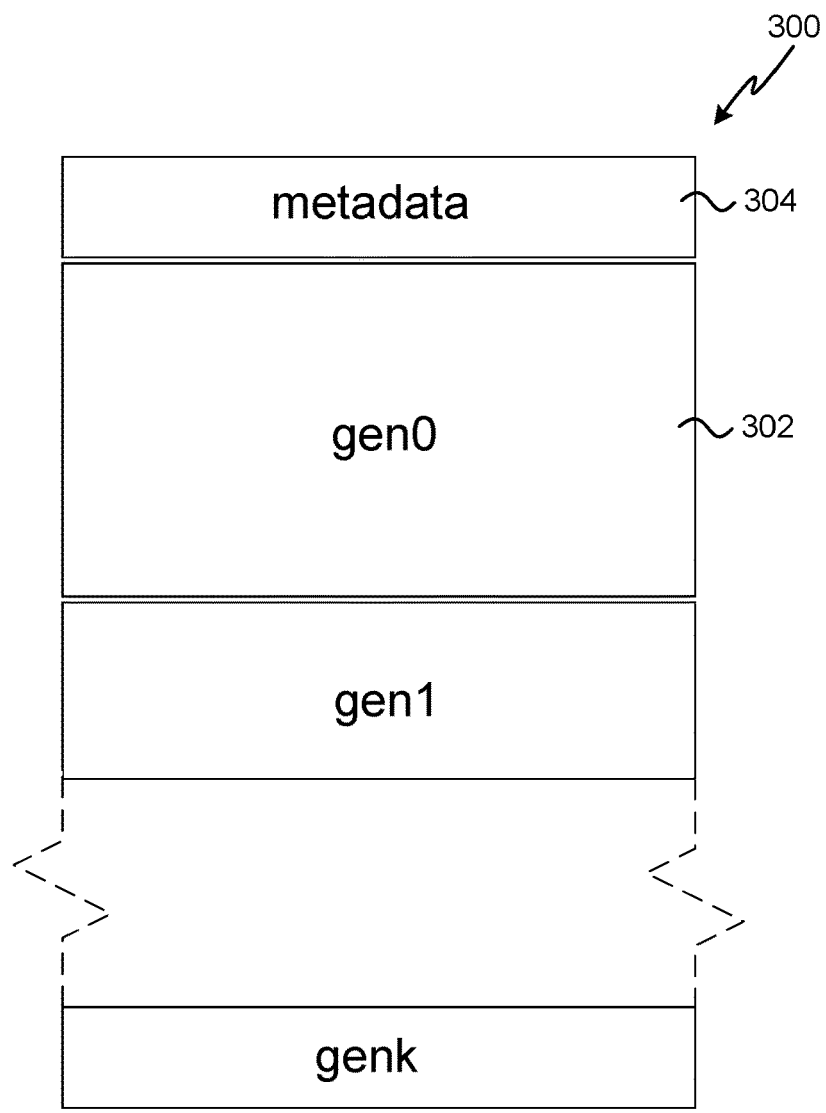
FIG. 3 is a schematic diagram showing a portion of the manual heap.

In various examples where the heap managed by the allocator is organized as a set of segments (where each segment is a contiguous part of the address space, e.g. a power of 2, max 4 GB), each segment 300 may be further divided into generations 302 as shown in FIG. 3. The first generation gen0 may be half the size of the segment and each subsequent generation may be half the size of its previous generation. This size ratio may be used in examples where pages are relocated if the fragmentation exceeds 0.5 (as described above) because in such examples, gen1 will need at most to be able to store data filling half of gen0, and similarly gen2 will need at most to be able to store data filling half of gen1, etc. Where relocation is performed for a different degree of fragmentation, the relationship between the sizes of adjacent generations may be different.

Each segment reserves space at the start of gen0 for metadata 304. The metadata section may be organized as an array with an entry for each page in the segment. Each metadata entry contains information such as the offset of the first and last object allocated in the page and the cumulative size of allocated objects on the page. The use of segments and generations (as shown in FIG. 3) assists in tracking where objects are copied from and to within the virtual address space and may reduce the complexity of checking equality of two references, as described below. In such examples, when live objects are promoted, they are promoted to a page in the next generation within the same segment.

The method of FIG. 2 does not reuse virtual pages allocated to a generation. Instead, the allocator reclaims physical memory associated with pages in the generation that mostly contain deleted objects and physical memory can be reclaimed without reclaiming virtual address space.

In an example where the heap managed by the allocator is organized as a set of segments (as shown in FIG. 3), the allocator maintains a list of segments. Each application thread allocates a thread-local buffer from gen0 of the last allocated segment. It uses this buffer for servicing allocation requests originating from the thread. The allocator maintains thread-local free pointer (which initially is set to the start of the buffer) and a pointer to the end of the buffer. Each allocation request checks if there is enough free space in the buffer, adds the object size to the free pointer and returns the previous free pointer. As long as there is space in the thread-local buffer, no synchronization is required. When a thread runs out of free space in the buffer, it synchronizes with other threads and obtains a new buffer. A new segment is allocated when gen0 of the last allocated segment runs out of free space. This allocator does not explicitly maintain the size of each allocation. In a strongly typed language, each object stores a pointer to its type, which in turn contains the object size. The allocator treats objects of size greater than 32 KB as large objects. These objects are allocated from a large object heap (LOH) allocated at the bottom of the address space. In the LOH, objects do not share pages. When a large object is freed, the allocator unmaps the corresponding pages (in block 206).

The allocator processes delete requests by marking objects as free (as described above). If the deallocated object belongs to gen0, the allocator checks if all objects allocated on the page containing the object have been also been deleted (in block 204, e.g. using per-page metadata described above). In this case, the allocator immediately unmaps the page (in block 206). Any subsequent accesses to this virtual page will trigger an access violation. Pages in higher generations (i.e. gen1 to genk) and pages in gen0 that are not entirely free are reclaimed by a background process as described above (e.g. in blocks 208-220).

The methods described above with reference to FIGS. 1-3 are described as eager relocation because objects are relocated and memory reclaimed without waiting for all objects on a particular page to be free. As described above live objects are moved when the fragmentation exceeds a threshold (in block 208).

Figure 4:
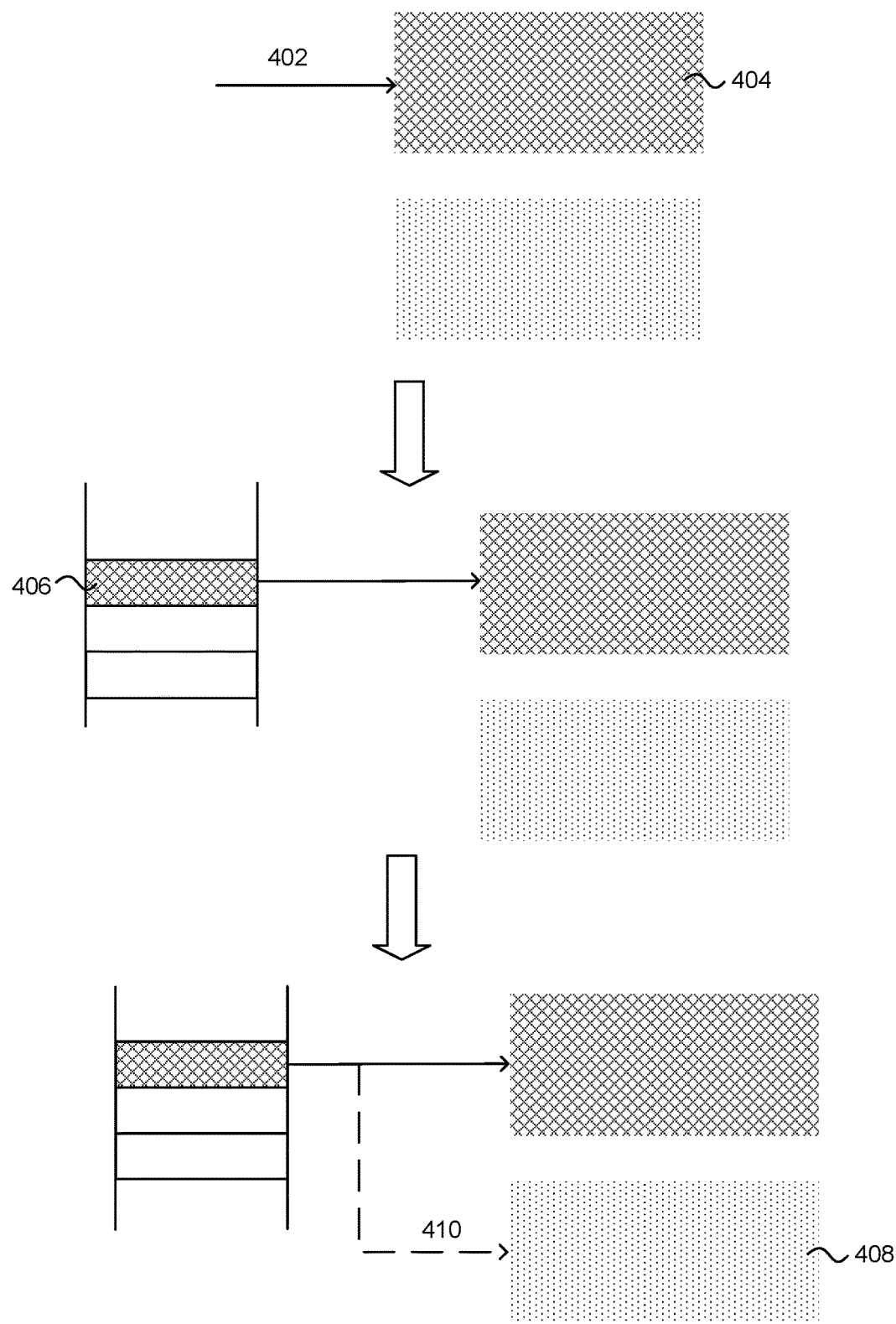
FIG. 4 shows a graphical representation of an example method of memory management that involves lazy patching of invalid references.

A method of memory management that involves lazy patching of references can be described with reference to FIGS. 4 and 5A. An attempt to use a reference (arrow 402 in FIG. 4) to an object 404 which has been moved will result in an access violation and this is detected by exception handling logic installed by the allocator (block 502). The allocator identifies the source 406 of the access which resulted in the violation (block 504) and determines the new location of the object 408 to which the failed reference related using the stored mapping data (block 506). The new location, in the form of an updated reference (arrow 410) to the object 408, is then used to replace the invalid reference in the source (block 508).

As described above, the number of references to an object that are frequently used for dereferencing is small, hence it is more efficient to patch references when a dereference fails instead of patching all references when they are loaded.

In various examples, the exception handler detects an access violation (in block 502) when it receives an exception context as input (e.g. register values and type of exception e.g. read or write). The exception handler retrieves the faulting heap address from the exception context and uses this to find the address of the target object (in block 506).

Figure 5A:
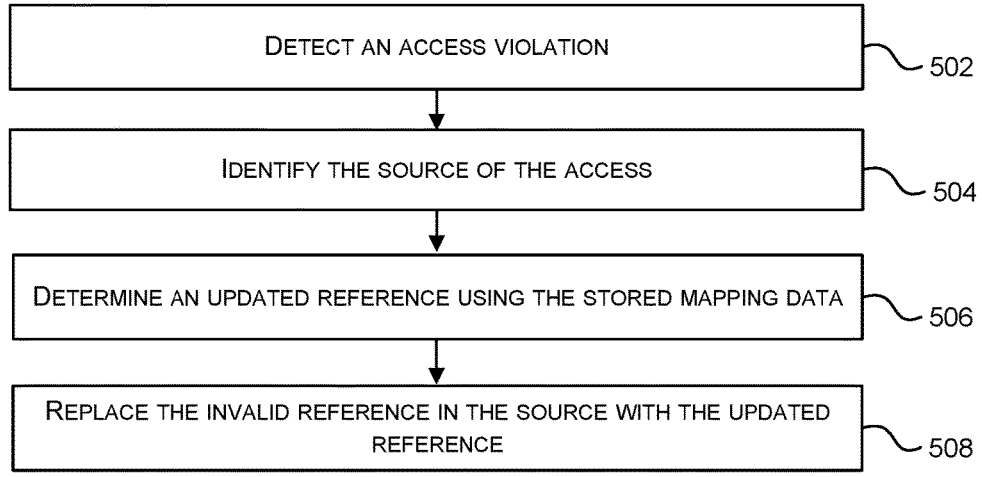
FIG. 5A is a flow diagram of example method of memory management that involves lazy patching of invalid references.

It will be appreciated that whilst FIG. 5A shows that the source is identified before the new reference is determined, in other examples the two operations (blocks 504 and 506) may be performed in the other order or substantially in parallel.

Figure 5B:
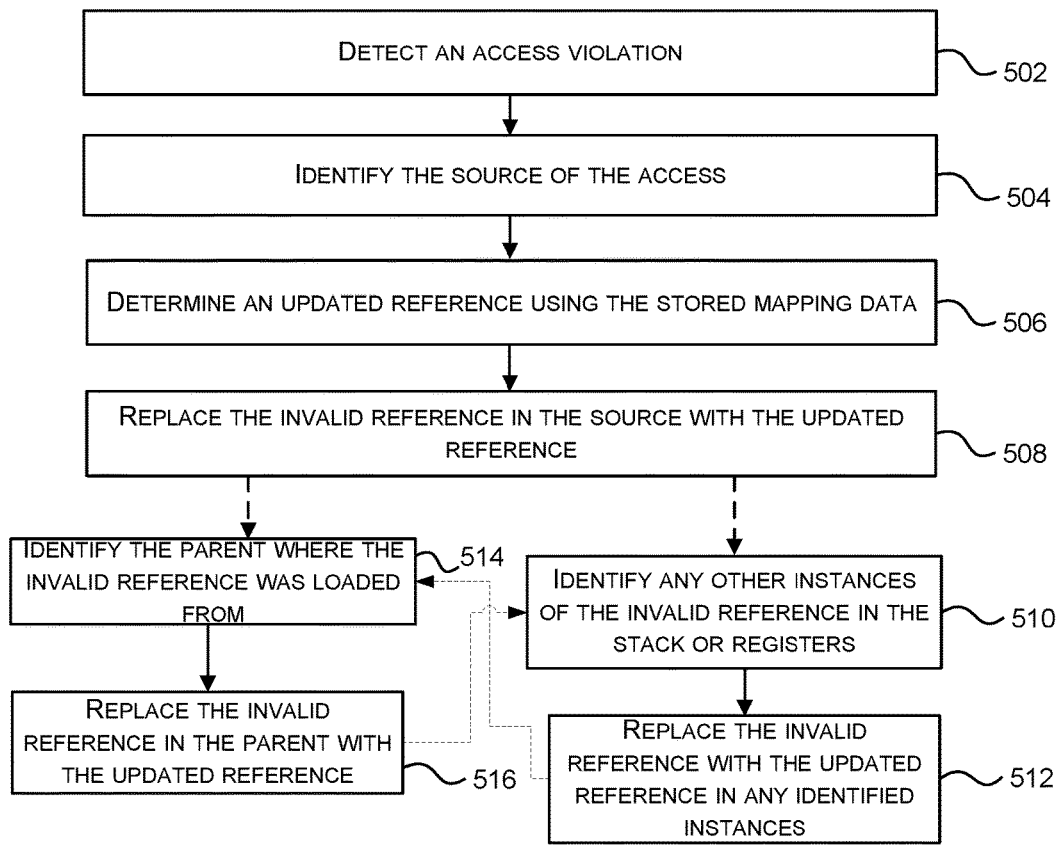
FIG. 5B is a flow diagram of another example method of memory management that involves lazy patching of invalid references.

FIG. 5B shows two enhancements to the method of FIG. 5A and these may be implemented separately or together (as indicated by the dotted arrows from block 512 to block 514 and from block 516 to block 510). In a first enhancement, the exception handler logic scans all registers and the stack (block 510) and patches all invalid references 402 to the object 404 that has moved (block 512). This reduces the number of subsequent access violations which occur.

In various examples, when scanning the stack (in block 510) the current stack frame is scanned and if no invalid reference (which may alternatively be referred to as a stale reference) is found in the current stack frame, the exception handler pops the stack frame and continues the scan. The handler stops popping stack frames once an invalid reference is found.

In a second enhancement, the object where the invalid reference was loaded from is identified (block 514), i.e. the object in the heap that contains a reference to the object to which the invalid reference relates, and the invalid reference in the parent is also updated (block 516). By patching the 'parent' (i.e. the object that contains a reference to the object that has been moved, where the object that has been moved is referred to as the 'child'), the number of subsequent access violations is reduced. This is because if the parent is not patched (in block 516), every time the child is loaded from its parent into the stack or registers (which are temporary state), use of the reference will result in an access violation.

For example, considering the following C# code fragment:

```
int GetFirst(List<T> list) {
    Node<T> node = list.First;
    return node.Value;
}
```

If the object pointed to by the field First of parameter list is promoted, the method shown in FIG. 5A will patch the reference node since it is stored in a register or on the stack. However, the object 'list' continues to store a stale reference to 'node'. Without the second extension, the patching algorithm described above does not patch parents, and so the dereference 'node.Value' will trigger an access violation every time 'node' is loaded from its parent.

The second enhancement therefore provides a modification to the exception handler to follow objects directly reachable from registers or the stack (in block 514) and patch references in these objects (in block 516).

An implementation of the second enhancement can be described with reference to the C# code fragment above. That code translates to the following instruction sequence:
mov r2, [r1+8]
mov r3, [r2+16]
Here, the register r1 contains the reference to 'list', the field 'First' is located at offset 8 in the 'List<T>' class, and Value is located at offset 16 in 'Node' and r1 refers to the parent of 'node'. If 'node' is promoted (e.g. using the method of FIG. 2), accessing this object will fail. The enhanced exception handler (i.e. an exception handler that implements the second enhancement of blocks 514-516) scans the object 'list' (in block 514) and patches the reference to 'node' (in block 516). Any subsequent reads from 'list' will return a reference to the promoted object.

The second enhancement as described above may only be effective when a register or stack contains a parent when an object is accessed. In the example above, r1 happens to contain a parent when 'node' is accessed (as an artifact of the way code is generated). However, there are several cases where this is not true. For example, if 'list' is no longer live after the first dereference, the compiler is free to reuse r1 for storing other values. Consequently, the compiler may be modified to ensure that when an object is accessed, a reference to the parent exists in the roots.

The first modification in the compiler extends the lifetime of variables containing references to parents to include uses of all the child objects (up to the next write to the variable). If a child object is passed to a method, the lifetime of the parent is extended to include the function call. In the example described above, this transformation extends the lifetime of 'list' to include the dereference 'node.Value'. This ensures that 'list' is either in a register or on the stack when the dereference occurs.

The second modification in the compiler is targeted at arrays of references. Modifications are made to code generation so that operations such as array indexing explicitly expose parents in the roots. For example, consider the pattern arr[i].Value. The .NET compiler translates this pattern into the following instruction sequence.
mov r1, [r2+r3*8+16]
mov r3, [r1+24]
Here, r2 contains a reference to the array arr, r3 contains index i and the field 'Value' is stored at an offset 24 within element. This sequence loads a reference to the object at index i in register r1. However, there is no register or stack location containing the address of this reference. By modifying the compiler, this pattern is translated to the following sequence.
lea r4, [r2+r3*8+16]
mov r1, [r4]
mov r3, [r1+24]
With this modification, the compiler splits the array indexing operation into two instructions. The first instruction loads the address of the array element into a register (r4), and the second instruction loads the reference. This sequence requires an extra instruction and an additional register. However, it makes the reference to the parent explicit (so that it can be identified in block 514), and allows the exception handler to patch the reference (in block 516).

Figure 6:
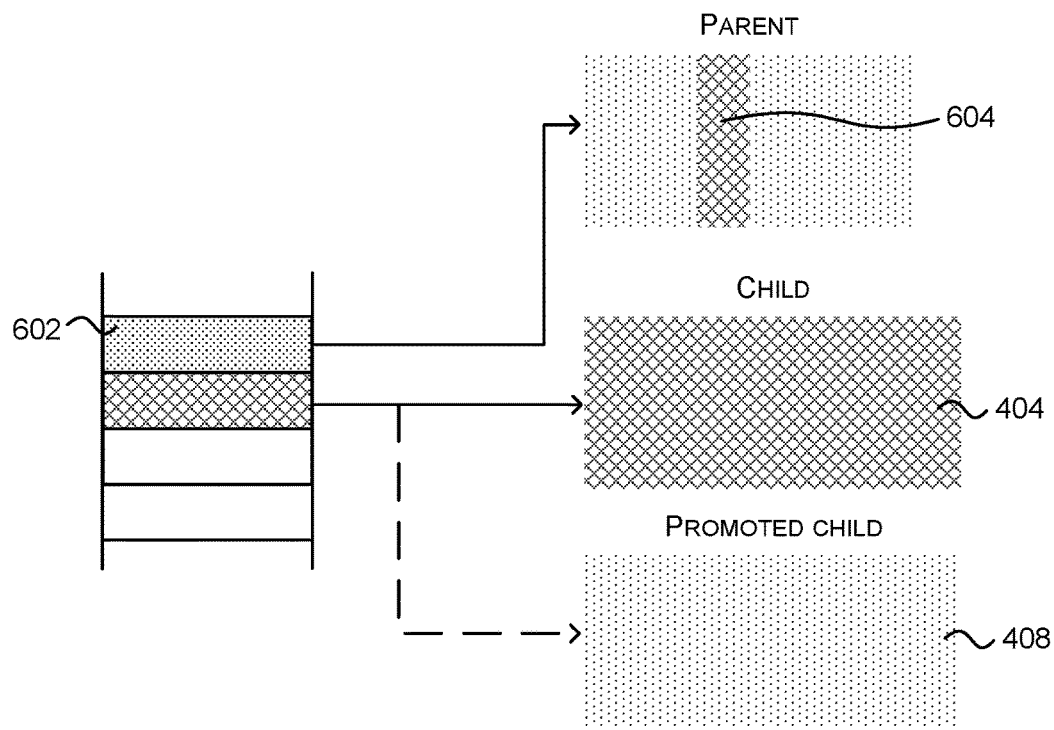
FIG. 6 shows a graphical representation of a part of the method of FIG. 5B.

FIG. 6 is a graphical representation showing the modifications implemented in the compiler. The parent reference 602 is explicitly loaded in the roots (i.e. stack or registers) so that the invalid reference 604 that it contains (which points to the original location of the child 404) can be patched so that it refers to the new (i.e. promoted) location of the child 408.

Another scenario where references to parents do not appear in the roots is when objects are returned from method calls. This is because parents in the callee stack frame disappear when the stack frame is popped. This may be addressed by a further modification in the compiler which instruments every method that returns an object to push the parent reference of the returned reference into a circular buffer maintained by the runtime. The access violation handler is also configured to scan the buffer (in block 514), follow references in the buffer (also in block 514) and patch parent objects (in block 516).

The methods described above with reference to FIGS. 4-6 are described as lazy patching because the references to objects which have been moved are not patched until the reference is used (in block 506), e.g. to dereference. A reference is not patched when checking for equality but instead the equality checking logic is extended to account for references to objects that have been moved that have not been patched as described below.

Checking equality of two references is a common primitive supported by most languages and as it is an extremely frequent operation, it needs to be performed quickly. As references are patched lazily (as described above with reference to FIGS. 4-6), an application may attempt to check equality of two invalid references of an object that has been promoted, or compare an invalid reference with a reference to the promoted object.

The following pseudo-code provides an example implementation for equality checking where eager relocation is used.

```
#define SEGMENT_OF(addr)
    (addr & FFFFFFFF00000000)
#define SEGMENT_OFFSET(addr) (DWORD)(addr)
```

```
#define GEN_OFFSET(ref) return __lzcnt(~
    SEGMENT_OFFSET(ref))
reference_equal(ref1, ref2) {
    if (ref1 == ref2) return true;
    if (SEGMENT_OF(ref1) != SEGMENT_OF(ref2) ||
      GEN_OFFSET(ref1) == GEN_OFFSET(ref2))
        return false;
    if (ref1 > ref2) xchg(ref1, ref2);
    if (IS_PROMOTED(ref1)) {
        if (!IS_PROMOTED(ref2))
            return SEGMENT_OFFSET(ref1) == *(DWORD*)((
                BYTE*)ref2 + OFFSET_OF(GEN_OFFSET(ref1)
            ));
        else {
            return slow_path(ref1, ref2);
        }
    }
    return false;
}
```

Consider the case where two references ref1 and ref2 are not bitwise equal. Let these references point to objects obj1 and obj2 respectively such that obj2 belongs to the same or higher generation than obj1. The equality checker uses the following invariants to ascertain if the two references are references to different copies of the same object.

References to objects in two different segments are not equal because we objects are only promoted to generations in the same segment.

References to objects in the same generation are not equal.

If obj1 has not been promoted, then the references are not equal (since no other copy of obj1 exists).

The references are equal only if obj2 has not been promoted yet and segment-relative source object offset of obj1 is contained in the list of source offsets stored in the header of obj2.

These checks, which are a consequence of the segment structure shown in FIG. 3 and described above, can be discharged quite quickly and without using large amounts of processing power. The generation an object belongs to can be computed by counting the number of consecutive is in the segment-relative offset of the object (e.g. using the lzcnt or bsr instruction on Intel processors). It can be determined if an object has been promoted by looking up the mapping data (e.g. the remap table described above).

If these checks fail and obj2 has not been promoted, the source object offset stored in the header of obj2 is used to determine if the references are equal. If obj2 has been promoted, its header cannot be accessed anymore and in this case the method finds where this object has been promoted to using the mapping data and checks the promoted object's header.

The lazy patching methods described above may be used instead of an eager repatching method (e.g. that patches references when they are loaded). In various examples, however, the lazy patching methods described herein may be used in combination with an eager approach and in various examples this eager approach may be used if a rate of access violations (as detected in block 502) exceeds a threshold rate. In such examples, the allocator creates a background dedangling thread which scans live objects in allocated pages and patches stale references (to objects that have been promoted).

In an example implementation, dedangling may be triggered when the cumulative rate of access violations across threads exceeds 125,000 violations/sec.

The relocation method described herein (e.g. with reference to FIGS. 1-3) does not reuse virtual address space; it simply allocates a new segment when it runs out of space in the current segment. Generally, virtual address space consumption is unlikely to be a concern for most applications; however, for long running applications such as web servers and databases that allocate objects at high rates, the application will run out of virtual address space eventually. For example, an application allocating 3 GB memory every second will run out of virtual address space in a day. In various examples, the methods described herein may further comprise a compaction phase to handle such rare events.

The compaction phase de-fragments the heap by relocating all objects in a segment to a contiguous block of memory in the beginning of gen0 in the same segment and patching all stale references in the heap. However, gen0 may already contain live objects and mutators actively allocating objects in previously allocated thread-local buffers. To create space for relocation, the allocator first disables allocation of new thread-local buffers in the segment, and then estimates the number of allocated bytes (k) in the segment assuming that all previously allocated thread local buffers are fully utilized. If there is not enough free (unmapped) space in the initial k bytes of gen0 and no mutators are actively allocating in initial k bytes, the allocator promotes all live objects in the initial k bytes to gen1 (and higher generations if required).

Once the allocator has created space in gen0, it can start compacting objects. However, note that at this stage, virtual pages in gen0 may have been unmapped and must be mapped again before relocating objects. However, mapping these pages is not safe because the application may have stale references to objects originally allocated in gen0. Therefore, before relocating objects to gen0, stale references to all previously allocated objects are removed by first running a dedangling phase that scans objects in the heap (concurrently with mutators), replaces references to freed objects with NULL values and patches all other references. Then all tracking state (i.e. state that tracks pages written by an application) is cleared, so that the application can identify pages written after a certain point in time, and dedangling is rerun (as described above this scans live objects in allocated pages and patches stale references to objects that have been promoted). All mutator threads are then suspended to prevent mutators from creating any new stale references. All pages written by mutator threads are queried and all pages that have been written are scanned and any stale references which are found are patched. References in the roots of all threads are also patched before all mutator threads are resumed.

This routine does not guarantee that all dereferences are patched; it only guarantees that there are no stale references to objects deleted before the routine was invoked. The dedangling phase may, in various examples, be run twice to minimize the amount of time spent in scanning pages while mutators are suspended. The first dedangling phase patches a majority of stale references and the second dedangling phase touches only a small number of pages, which reduces the number of pages that have been written to (since the tracking state was last cleared).

After dedangling all references, the allocator relocates all live objects in each segment to the beginning of gen0 in a manner similar to promotion (e.g. as described above with reference to FIGS. 1-3). While relocating an object, the allocator stores the segment-relative offset of the object in the header of the relocated object in gen0. Once all objects have been relocated, the allocator re-runs the protocol described above for removing all stale references. Finally, the remap table for the segment is flushed. The segment is now reset to a clean state (where all objects have been allocated in a contiguous block of memory at the beginning of gen0 and there are no stale references to these objects), and can be used for allocations.

Relocating objects to gen0 violates one of the invariants assumed by equality checking i.e. two objects that belong to the same generation in the same segment are not equal. Therefore, where compaction is used, the equality checking logic may be extended to account for relocated objects in segments where compaction is in progress. Specifically, when two references are not bitwise equal, the equality checking logic checks if one of the references points to a relocated object (has an offset smaller than the size of the compacted block of memory at the beginning of gen0). If the object is a relocated object, the offset stored in its header is compared with the offset of the other object.

In an example implementation, compaction may be triggered when the application is running out of virtual address space and when the application is close to exhausting physical memory.

The methods described herein may be applied to any safe managed language. In various examples, the methods may be integrated into the .NET Native toolchain which is an ahead-of-time compilation toolchain for .NET applications. The toolchain consists of a compiler (based on Microsoft's C/C++ compiler), a .NET runtime and a set of libraries. The compiler frontend translates .NET binaries (in MSIL) to an intermediate language, which is then translated into architecture specific assembly code by the backend. The optimized native code is linked with the .NET runtime to generate a standalone executable. As a consequence, applications compiled with .NET Native do not suffer from high initialization costs. Furthermore, the compiler backend is not subject to the same memory and time constraints as just-in-time compilers, and therefore supports many of the analysis and optimizations supported by the C/C++ compiler.

The methods described herein may be integrated into the .NET runtime by disabling the GC and redirecting all allocation requests to an allocator which implements the methods described herein.

The methods described herein provide a fast method of manual memory management in safe languages with the garbage collected heap replaced by a manual hap. Experiments have shown that the methods may achieve up to a 3 times reduction in memory and run time.

The methods described herein are easy for both for the compiler writer and the programmer to use: there are no uniqueness or ownership restrictions that affect the static type system and expressiveness of the language, no restrictions on pointer aliasing, concurrent sharing of pointers, or allocation and deallocation sites.

Second, for C/C++ programmers, the methods described herein offer a similar level of control over memory usage and both type and temporal safety are guaranteed. This provides stronger security guarantees than C/C++ since programming errors no longer result in memory corruptions and vulnerabilities. Furthermore, errors result in exceptions, which are easier to diagnose. To detect spatial safety errors such as out of bounds accesses, uninitialized pointer dereferences and invalid type conversions, existing compile-time and run-time mechanisms from safe languages can be re-used.

The methods described herein guarantee temporal safety by (a) ensuring that each object is assigned a unique virtual address i.e. virtual addresses are never reused (until it is safe to do so), and (b) by unmapping an object from the application's address space when the object has been deleted. Therefore, any accesses to the object once the object has been unmapped result in an access violation. The resulting exception is caught by the allocator as described above. This is efficient because it uses the memory management unit in the processor to detect accesses to deleted objects.

Using the methods described herein, even if objects with different lifetimes are temporarily collocated on the same page, the copying mechanism groups objects with similar lifetimes. This reduces memory fragmentation which would otherwise impact negatively the performance of the virtual memory system. Additionally very fast bump allocation—essentially just a bounds check and incrementing a pointer in the common case—can be used; the allocator does not need to worry about reducing fragmentation, because the copying mechanism handles it. Finally, if a series of objects with similar lifetimes are allocated and deallocated in sequence (a common scenario), the virtual memory addresses for the corresponding pages are unmapped, achieving quick physical memory reclamation, without requiring any copying or compaction. In all cases, tracing of the object graph through potentially very large heaps is not performed, because the programmer specifies when memory should be deallocated; this enables the methods described herein to achieve large performance gains over garbage collected systems.

Figure 7:
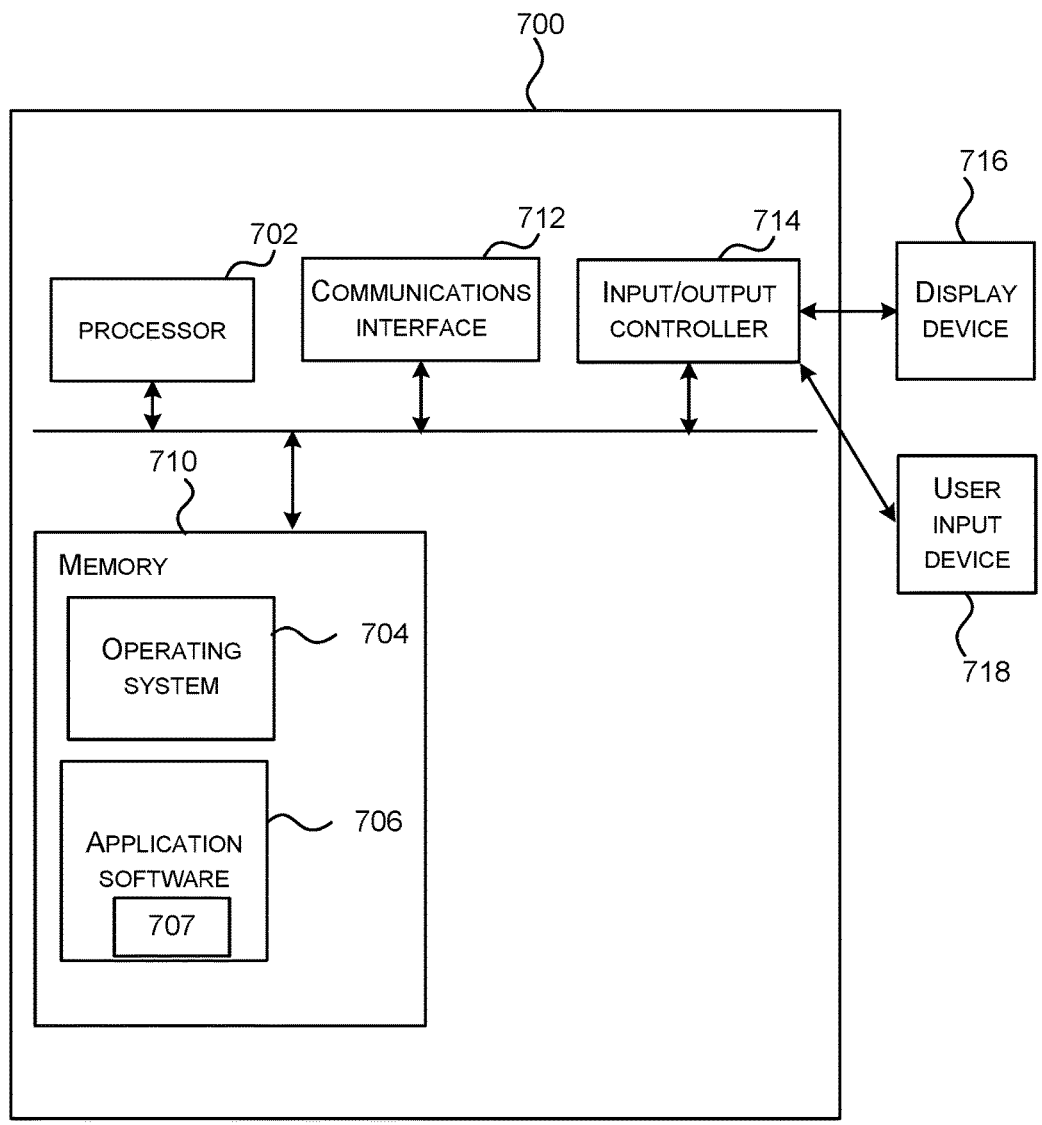
FIG. 7 illustrates an exemplary computing-based device in which embodiments of the methods of memory management described herein may be implemented.

FIG. 7 illustrates various components of an exemplary computing-based device 700 which are implemented as any form of a computing and/or electronic device, and in which embodiments of the methods described herein may be implemented.

Computing-based device 700 comprises one or more processors 702 which are microprocessors, controllers or any other suitable type of processors for processing computer executable instructions to control the operation of the device in order to implement safe manual memory management. In some examples, for example where a system on a chip architecture is used, the processors 702 include one or more fixed function blocks (also referred to as accelerators) which implement a part of the method of manual memory management in hardware (rather than software or firmware). Platform software comprising an operating system 704 or any other suitable platform software is provided at the computing-based device to enable application software 706 (which includes an allocator 707 as described above) to be executed on the device. The allocator 707 uses support for memory management provided by the operating system 704.

The computer executable instructions are provided using any computer-readable media that is accessible by computing based device 702. Computer-readable media includes, for example, computer storage media such as memory 710 and communications media. Computer storage media, such as memory 710, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 710) is shown within the computing-based device 700 it will be appreciated that the storage is, in some examples, distributed or located remotely and accessed via a network or other communication link (e.g. using communication interface 712).

The computing-based device 700 also comprises an input/output controller 714 arranged to output display information to a display device 716 which may be separate from or integral to the computing-based device 700. The display information may provide a graphical user interface. The input/output controller 714 is also arranged to receive and process input from one or more devices, such as a user input device 718 (e.g. a mouse, keyboard, camera, microphone or other sensor). In some examples the user input device 718 detects voice input, user gestures or other user actions and provides a natural user interface (NUI). This user input may be used to control the operation of the computing device 700. In an embodiment the display device 716 also acts as the user input device 718 if it is a touch sensitive display device. The input/output controller 714 outputs data to devices other than the display device in some examples.

Any of the input/output controller 714, display device 716 and the user input device 718 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in a computing device as shown in FIG. 7, the system described is provided as an example and not a limitation. As those skilled in the art will appreciate, the present examples are suitable for application in a variety of different types of computing devices.

A first further example provides a method of manual memory management comprising, in response to detecting an access violation when an invalid reference to an object in a manual heap is used: identifying a source of the access in a register or stack; determining an updated reference for the object using stored mapping data; and replacing the invalid reference in the source with the updated reference.

Alternatively or in addition to the other examples described herein, any of the further examples described herein may include any combination of the following features:

The manual heap may be defined in virtual address space and divided into a plurality of pages; and/or The invalid reference may be a consequence of the object having been copied from a first page in the virtual address space to a second page in the virtual address space; and/or The stored mapping data may define a mapping from a location of the object on the first page to a location of the object on the second page; and/or The method may further comprise, in response to detecting an access violation when an invalid reference to an object in a manual heap is used: searching the registers and stack to identify any other instances of the invalid reference; and replacing the invalid reference in any identified instances with the updated reference; and/or Identifying a source of the access in a register or stack may comprise: searching a current stack frame for the invalid reference; and in response to failing to find the invalid reference in the current stack frame, repeatedly popping the current stack frame and searching a next stack frame until the invalid reference is found; and/or The invalid reference and updated reference may be to a child object; and/or The method may further comprise, in response to detecting an access violation when an invalid reference to a child object in a manual heap is used: identifying a parent object in the manual heap, wherein the parent object is an object from which the source was loaded into the register or stack; and replacing the invalid reference to the child object in the parent object with the updated reference to the child object; and/or The method may further comprise, at compile-time: extending a lifetime of a variable containing a reference to the parent object such that the variable containing the reference to the parent object is in a register or stack when any references to the child object are used; and/or The method may further comprise, at compile-time: modifying generation of code to explicitly expose references to the parent object in the stack and/or registers; and/or The method may further comprise, at compile-time: instrumenting every method that returns a child object to push a reference to the parent object into a circular buffer, and wherein identifying a parent object in the manual heap comprises: scanning the circular buffer for a reference to the parent object; and/or The method may further comprise: in response to deallocation of an object in a manual heap, marking the object as freed; in response to determining that an entire page of the virtual address space comprises only freed objects and no live objects, unmapping the page from physical address space; and in response to determining that fragmentation of one or more pages of the virtual address space exceeds a fragmentation threshold, selecting a page from the one or more pages, moving all live objects from the selected page to another page and unmapping the selected page from physical address space; and/or Selecting a page from the one or more pages, moving all live objects from the selected page to another page and unmapping the selected page from physical address space may comprise: first selecting a page from the one or more pages; disabling write access to the selected page; after disabling write access to the selected page, copying all live objects from the selected page to a target page; after copying all the live objects, disabling write access to the target page; storing mapping data mapping locations of all the live objects on the selected page to their locations on the target page; after copying all the live objects, unmapping the selected page from physical address space; and subsequently enabling write access to the target page; and/or The manual heap may be logically divided into segments and each segment is divided into a plurality of generations, and wherein moving all live objects from the selected page to another page comprises: moving all live objects from the selected page in a first generation in a segment to another page in a next generation within the same segment; and/or Determining that fragmentation of one or more pages of the virtual address space exceeds a fragmentation threshold may comprise: determining that fragmentation of the entire virtual address space exceeds a first fragmentation threshold; and in response to determining that fragmentation of the entire virtual address space exceeds a first fragmentation threshold, selecting a plurality of candidate pages; and repeatedly selecting a candidate page, moving all live objects from the selected candidate page to another page and unmapping the selected candidate page from physical address space until the fragmentation of the entire virtual address space does not exceed a second fragmentation threshold, wherein the first fragmentation threshold is higher than the second fragmentation threshold; and/or The method may further comprise: in response to detecting a rate of access violations in excess of a threshold rate, scanning live objects in the manual heap and replacing invalid references.

A second further example provides a method of memory reclamation comprising: in response to deallocation of an object in a manual heap, marking the object as freed, wherein the manual heap is defined in virtual address space and divided into a plurality of pages; in response to determining that an entire page of the virtual address space comprises only freed objects and no live objects, unmapping the page from physical address space; and in response to determining that fragmentation of one or more pages of the virtual address space exceeds a fragmentation threshold, selecting a page from the one or more pages, moving all live objects from the selected page to another page and unmapping the selected page from physical address space.

Alternatively or in addition to the other examples described herein, any of the further examples described herein may include any combination of the following features:

Selecting a page from the one or more pages, moving all live objects from the selected page to another page and unmapping the selected page from physical address space may comprise: first selecting a page from the one or more pages; disabling write access to the selected page; after disabling write access to the selected page, copying all live objects from the selected page to a target page; after copying all the live objects, disabling write access to the target page; storing mapping data mapping locations of all the live objects on the selected page to their locations on the target page; after copying all the live objects, unmapping the selected page from physical address space; and subsequently enabling write access to the target page; and/or The manual heap may be logically divided into segments and each segment is divided into a plurality of generations; and/or Moving all live objects from the selected page to another page may comprise: moving all live objects from the selected page in a first generation in a segment to another page in a next generation within the same segment; and/or Determining that fragmentation of one or more pages of the virtual address space exceeds a fragmentation threshold may comprise: determining that fragmentation of the entire virtual address space exceeds a first fragmentation threshold; and in response to determining that fragmentation of the entire virtual address space exceeds a first fragmentation threshold, selecting a plurality of candidate pages; and repeatedly selecting a candidate page, moving all live objects from the selected candidate page to another page and unmapping the selected candidate page from physical address space until the fragmentation of the entire virtual address space does not exceed a second fragmentation threshold, wherein the first fragmentation threshold is higher than the second fragmentation threshold; and/or Fragmentation of the entire virtual address space may be determined by dividing a number of bytes yet to be reclaimed by a number of bytes allocated to live objects; and/or The first fragmentation threshold may be equal to 0.5.

A third further example provides a method comprising two or more of: modifying, in a compiler, generation of code to explicitly expose references to a parent object in the stack or registers, wherein a parent object is an object in a manual heap that contains a reference to a second object, wherein the second object is a child object corresponding to the parent object; and extending, in the compiler, a lifetime of a variable containing a reference to a parent object such that the variable containing the reference to the parent object is in a register or stack when any references to a corresponding child object are used; instrumenting, in the compiler, every method that returns a child object to push a reference to the corresponding parent object into a circular buffer.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of manual memory management comprising:
in response to detecting an access violation when an invalid reference to a child object in a manual heap is used:
identifying a source of the access violation in a register or stack;
identifying a parent object in the manual heap, wherein the parent object is an object from which the source was loaded into the register or stack;
determining an updated reference for the child object using stored mapping data; and
replacing the invalid reference in the source with the updated reference to the child object in the parent object.

2. The method according to claim 1, wherein the manual heap is defined in virtual address space and divided into a plurality of pages and wherein the invalid reference is a consequence of the object having been copied from a first page in the virtual address space to a second page in the virtual address space.

3. The method according to claim 2, wherein the stored mapping data defines a mapping from a location of the object on the first page to a location of the object on the second page.

4. The method according to claim 1, further comprising, in response to detecting an access violation when an invalid reference to an object in a manual heap is used:
searching the register and stack to identify any other instances of the invalid reference; and
replacing the invalid reference in any identified instances with an updated reference.

5. The method according to claim 4, wherein identifying a source of the access in a register or stack comprises:
searching a current stack frame for the invalid reference; and
in response to failing to find the invalid reference in the current stack frame, repeatedly popping the current stack frame and searching a next stack frame until the invalid reference is found.

6. The method according to claim 1, further comprising, at compile-time:
extending a lifetime of a variable containing a reference to a parent object such that the variable containing the reference to the parent object is in a register or stack when any references to a child object are used.

7. The method according to claim 1, further comprising, at compile-time:
modifying generation of code to explicitly expose references to a parent object in the stack or registers.

8. The method according to claim 1, further comprising, at compile-time:
instrumenting memory management patches that return a child object to push a reference to a parent object into a circular buffer,
and wherein identifying a parent object in the manual heap comprises:
scanning the circular buffer for a reference to the parent object.

9. The method according to claim 1, wherein the manual heap is defined in virtual address space and divided into a plurality of pages, the method further comprising:
in response to deallocation of an object in a manual heap, marking the object as freed;
in response to determining that an entire page of the virtual address space comprises only freed objects and no live objects, unmapping the page from physical address space; and
in response to determining that fragmentation of one or more pages of the virtual address space exceeds a fragmentation threshold, selecting a page from the one or more pages, moving all live objects from the selected page to another page and unmapping the selected page from physical address space.

10. The method according to claim 9, wherein selecting a page from the one or more pages, moving all live objects from the selected page to another page and unmapping the selected page from physical address space comprises:
first selecting a page from the one or more pages;

disabling write access to the selected page;
after disabling write access to the selected page, copying all live objects from the selected page to a target page;
after copying all the live objects, disabling write access to the target page;
storing mapping data mapping locations of all the live objects on the selected page to their locations on the target page;
after copying all the live objects, unmapping the selected page from physical address space; and
subsequently enabling write access to the target page.

11. The method according to claim 9, wherein the manual heap is logically divided into segments and each segment is divided into a plurality of generations, and wherein moving all live objects from the selected page to another page comprises:
moving all live objects from the selected page in a first generation in a segment to another page in a next generation within the same segment.

12. The method according to claim 9, wherein determining that fragmentation of one or more pages of the virtual address space exceeds a fragmentation threshold comprises:
determining that fragmentation of the entire virtual address space exceeds a first fragmentation threshold; and
in response to determining that fragmentation of the entire virtual address space exceeds a first fragmentation threshold, selecting a plurality of candidate pages;
and repeatedly selecting a candidate page, moving all live objects from the selected candidate page to another page and unmapping the selected candidate page from physical address space until the fragmentation of the entire virtual address space does not exceed a second fragmentation threshold, wherein the first fragmentation threshold is higher than the second fragmentation threshold.

13. The method according to claim 1, further comprising:
in response to detecting a rate of access violations in excess of a threshold rate, scanning live objects in the manual heap and replacing invalid references.

14. A method of memory reclamation comprising:
in response to deallocation of an object in a manual heap, marking the object as freed, wherein the manual heap is defined in virtual address space and divided into a plurality of pages;
in response to determining that an entire page of the virtual address space comprises only freed objects and no live objects, unmapping the page from physical address space; and
in response to determining that fragmentation of one or more pages of the virtual address space exceeds a fragmentation threshold, selecting a page from the one or more pages, moving all live objects from the selected page to another page and unmapping the selected page from physical address space.

15. The method according to claim 14, wherein selecting a page from the one or more pages, moving all live objects from the selected page to another page and unmapping the selected page from physical address space comprises:
first selecting a page from the one or more pages;
disabling write access to the selected page;
after disabling write access to the selected page, copying all live objects from the selected page to a target page;
after copying all the live objects, disabling write access to the target page;
storing mapping data mapping locations of all the live objects on the selected page to their locations on the target page;
after copying all the live objects, unmapping the selected page from physical address space; and
subsequently enabling write access to the target page.

16. The method according to claim 15, wherein the manual heap is logically divided into segments and each segment is divided into a plurality of generations, and wherein moving all live objects from the selected page to another page comprises:
moving all live objects from the selected page in a first generation in a segment to another page in a next generation within the same segment.

17. The method according to claim 15, wherein determining that fragmentation of one or more pages of the virtual address space exceeds a fragmentation threshold comprises:
determining that fragmentation of the entire virtual address space exceeds a first fragmentation threshold; and
in response to determining that fragmentation of the entire virtual address space exceeds a first fragmentation threshold, selecting a plurality of candidate pages; and
repeatedly selecting a candidate page, moving all live objects from the selected candidate page to another page and unmapping the selected candidate page from physical address space until the fragmentation of the entire virtual address space does not exceed a second fragmentation threshold, wherein the first fragmentation threshold is higher than the second fragmentation threshold.

18. The method according to claim 17, wherein fragmentation of the entire virtual address space is determined by dividing total non-reclaimed bytes by total bytes allocated to live objects.

19. A method comprising two or more of:
modifying, in a compiler, generation of code to explicitly expose references to a parent object in a stack or registers, wherein a parent object is an object in a manual heap that contains a reference to a second object, wherein the second object is a child object corresponding to the parent object;
extending, in the compiler, a lifetime of a variable containing a reference to a parent object such that the variable containing the reference to the parent object is in a register or stack when any references to a corresponding child object are used; and
instrumenting, in the compiler, memory management patches that return a child object to push a reference to the corresponding parent object into a circular buffer.

20. The method according to claim 17, wherein the first fragmentation threshold is 0.5.

* * * * *